United States Patent
Wang et al.

(10) Patent No.: US 9,496,937 B1
(45) Date of Patent: Nov. 15, 2016

(54) TRANSMIT ANTENNA SWITCHING

(71) Applicant: Verizon Patent and Licensing Inc., Arlington, VA (US)

(72) Inventors: Xin Wang, Morris Plains, NJ (US); Andrew E. Youtz, Princeton, NJ (US); Christopher M. Schmidt, Branchburg, NJ (US); Paul Venizelos, Ridgewood, NJ (US); Lily Zhu, Parsippany, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/808,333

(22) Filed: Jul. 24, 2015

(51) Int. Cl.
*H04B 1/02* (2006.01)
*H04B 7/06* (2006.01)
*H04B 17/12* (2015.01)
*H04B 17/10* (2015.01)
*H04B 7/04* (2006.01)

(52) U.S. Cl.
CPC .......... *H04B 7/0604* (2013.01); *H04B 7/0413* (2013.01); *H04B 17/104* (2015.01); *H04B 17/12* (2015.01)

(58) Field of Classification Search
CPC .................................................... H04B 7/0604
USPC ......................................................... 455/101
See application file for complete search history.

(56) References Cited

U.S. PATENT DOCUMENTS

| | | | | |
|---|---|---|---|---|
| 2010/0215111 A1* | 8/2010 | Filipovic | .............. | H04B 7/0608 375/267 |
| 2012/0027112 A1* | 2/2012 | Jiang | ...................... | H04B 7/061 375/267 |
| 2012/0064842 A1* | 3/2012 | Ferchland | ............ | H04B 7/0608 455/78 |
| 2013/0309981 A1* | 11/2013 | Ngai | .................... | H04B 7/0404 455/78 |

* cited by examiner

*Primary Examiner* — Sanh Phu

(57) ABSTRACT

A wireless communication device may include a logic configured to select a first antenna as a transmitting antenna and a second antenna as a non-transmitting antenna; and to calculate a short-term antenna metric difference between the transmitting antenna and the non-transmitting antenna, a mid-term antenna metric difference between the transmitting antenna and the non-transmitting antenna, and a long-term antenna metric difference between the transmitting antenna and the non-transmitting antenna. The logic may be further configured to switch the second antenna to the transmitting antenna and the first antenna to the non-transmitting antenna, in response to determining that at least one of the calculated short-term antenna metric difference is greater than a short-term threshold, the calculated mid-term antenna metric difference is greater than a mid-term threshold, or the long-term antenna metric difference is greater than a long-term threshold.

20 Claims, 9 Drawing Sheets

440 ⤵

| FILTERING COEFFICIENTS 550 | $T_0$ 552 | |
| --- | --- | --- |
| | $T_1$ 554 | |
| | $T_2$ 556 | |
| | $T_3$ 558 | |
| SWITCHING FREQUENCY CONSTANT 560 | | |
| THRESHOLDS 570 | TH-$D_1$ 572 | TH-$U_1$ 582 |
| | TH-$D_2$ 574 | TH-$U_2$ 584 |
| | TH-$D_3$ 576 | TH-$U_3$ 586 |
| | TH-$D_L$ 590 | |
| | TH-$D_H$ 592 | |

FIG. 5B

TRANSMIT ANTENNA SWITCHING

BACKGROUND INFORMATION

Wireless communication devices, such as mobile phones, may include multiple antennas for receiving signals. The use of multiple receiving antennas may improve device performance. For example, a device may be receiving signals via multiple antennas based on a multiple-input and multiple-output (MIMO) scheme, in which multiple antennas receive signals to achieve higher data rates and more robust reception of signals. However, even though a wireless communication device may be configured to receive signals over multiple antennas, in order to reduce cost, the wireless communication device may be configured to only use one antenna for transmitting signals.

BRIEF DESCRIPTION OF THE DRAWINGS

FIG. 5B is a diagram illustrating exemplary components that may be stored in the settings database of FIG. 4;

DETAILED DESCRIPTION OF PREFERRED EMBODIMENTS

Figure 1:
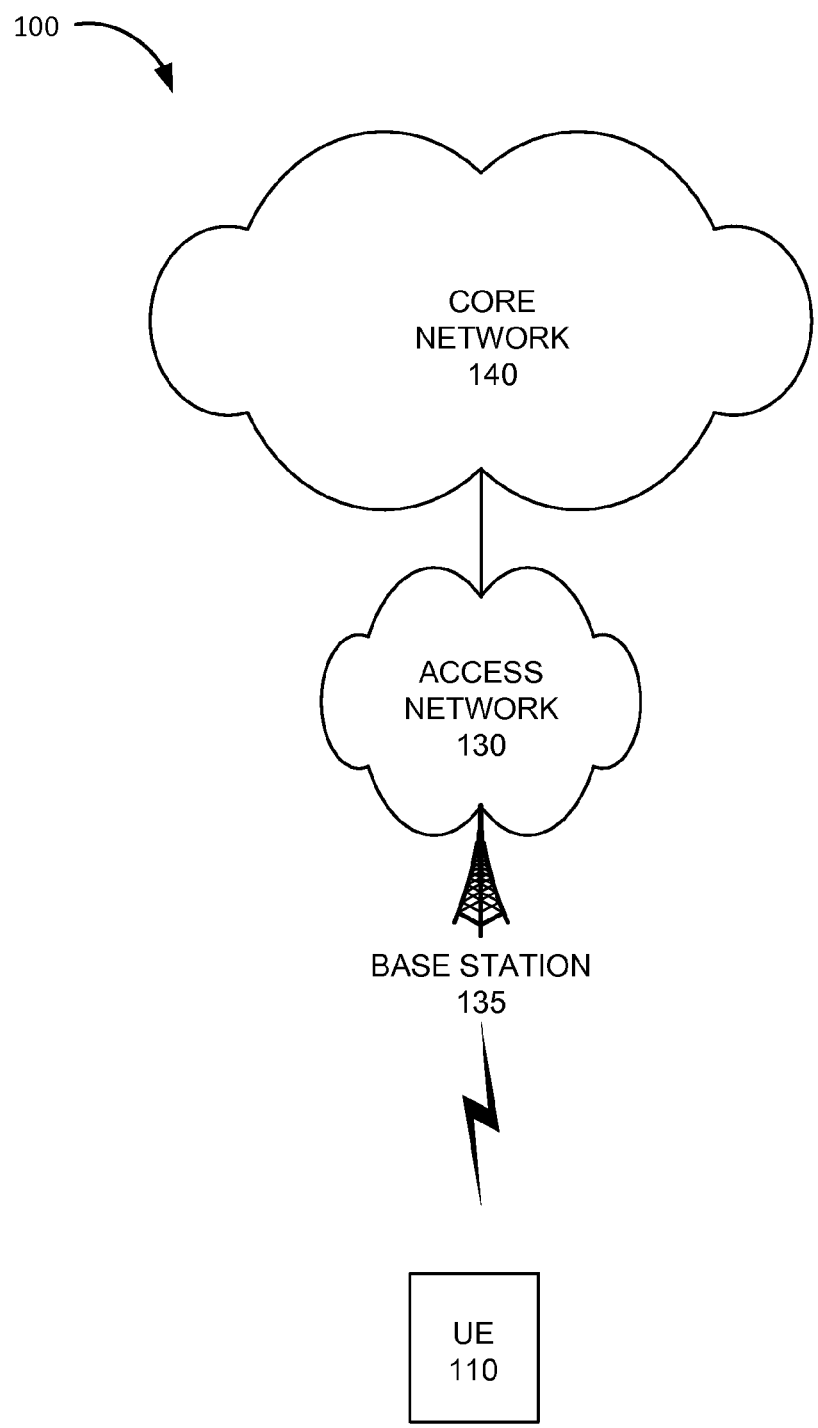
FIG. 1 is a diagram illustrating an environment according to an implementation described herein.

The following detailed description refers to the accompanying drawings. The same reference numbers in different drawings identify the same or similar elements.

Implementations described herein relate to transmit antenna switching. A wireless communication device that uses multiple antennas for receiving downlink signals may be configured to only use one of the antennas at a time for transmitting uplink signals. For example, the wireless communication device may be configured to receive multiple input and multiple output (MIMO) signals, but may include circuitry to use a single transmission antenna in order to reduce cost. In light of multiple antennas being available, the device may use an antenna switching scheme to dynamically select a transmitting antenna that provides better uplink performance during a particular time period.

Since the device uses a single transmitting antenna at a time, uplink performance metrics on any other non-transmitting antennas are unknown to the device. A transmit antenna switching scheme may thus rely only on the uplink metrics of the current transmit antenna or may rely on downlink metrics of multiple antennas that are receiving signals and for which performance metrics are available. However, in a frequency division duplex scheme, in which different carrier frequencies are used for downlink and uplink transmissions, downlink metrics and uplink metrics may be quite different for a particular antenna. Thus, transmit antenna switching schemes which rely on only the uplink metrics of a currently transmitting antenna or only on downlink metrics of antennas may result in inefficient transmit antenna switching.

The term "metric," as used herein, may refer to any parameter for which measurement values may be used to determine the performance of an antenna. The term "downlink," as used herein, may refer to signals received by a wireless communication device, such as signals received from a base station. The term "uplink," as used herein, may refer to signals transmitted by the wireless communication device to, for example, a base station.

Implementations described herein use uplink channel information on all antennas to make a better or more informed transmit antenna switching decision. Thus, uplink channel conditions, as measured by one or more metrics, are sampled from all antennas in order to overcome limitations of blind transmit antenna switching based only on measurements of the currently transmitting antenna. Since no direct uplink measurements of an uplink metric for a non-transmitting antenna may be available, an uplink metric for the non-transmitting antenna is estimated based on actual measurements on the non-transmitting antenna prior to switching.

Implementations described herein further relate to a transmit antenna switching scheme that uses a short-term antenna metric difference between a transmitting antenna and a non-transmitting antenna, a mid-term antenna metric difference between the transmitting antenna and the non-transmitting antenna, and a long-term antenna metric difference between the transmitting antenna and the non-transmitting antenna to determine whether to switch the transmitting and non-transmitting antennas. The short-term antenna metric difference measures a difference in an antenna metric for the transmitting and non-transmitting antenna over a short time period (e.g., 1 second), the mid-term antenna metric difference measures a difference in the antenna metric over a medium length time period that is longer than the short time period (e.g., 2 seconds), and the long-term antenna metric difference measures a difference in the antenna metric over a longer time period that is longer than the medium length time period (e.g., 4 seconds).

If at least one of the short-term antenna metric difference is greater than a short-term threshold, the mid-term antenna metric difference is greater than a mid-term threshold, or the long-term antenna metric difference is greater than a long-term threshold, the device may switch the transmitting and non-transmitting antennas. The use of metric differences over three different time periods may enable fast transmit antenna switching if the metric difference between the transmitting and non-transmitting antennas is large, while enabling antenna switching to still occur if there is a metric difference over a longer time period that is smaller yet still indicates that the non-transmitting antenna would perform better. Furthermore, by setting a higher threshold for the short-term antenna metric difference, inadvertent switching due to temporary metric differences is prevented, resulting in more efficient antenna switching.

While implementations described herein include a transmit antenna switching scheme that uses a short-term antenna metric difference, a mid-term antenna metric difference, and a long-term antenna metric difference, other implementations may use a different number of time periods for determining antenna metric differences. As an example, some implementations may only use a short-term antenna metric difference and a long-term antenna metric difference. As another example, other implementations may use a larger number of time periods (e.g., four different time periods and four different metric differences each compared to a particular threshold).

In some implementations, the metric may include a downlink metric. For example, a downlink metric may include a downlink Reference Signal Receive Power (RSRP) measurement, a Received Signal Strength Indicator (RSSI) measurement, a downlink pathloss measurement, an error rate measurement, and/or another type of downlink metric. In other implementations, the metric may include an uplink metric. For example, an uplink metric may include a power headroom measurement, a shared channel transmitting power measurement, a control channel transmitting power measurement, a Sounding Reference Signal (SRS) transmitting power measurement, a total transmitting power measurement, a percent of time interval reaching maximum power measurement, an antenna reflected power measurement, an uplink throughput measurement, an uplink Block Error Rate (BLER) measurement, an uplink modulation and coding scheme (MCS) metric measurement, and/or another type of uplink measurement.

Multiple metrics may be used in a combined manner. For example, a transmission power metric may be used when transmission power is not at a maximum power level, and uplink BLER and uplink MCS metrics may be used when transmission power is at the maximum power level. As another example, a transmission power metric may be used when transmission power is not at a maximum power level, and an antenna reflected power metric may be used when transmission power is at the maximum power level.

In some implementations, an antenna reflected power measurement may be a particularly useful uplink metric. A device may include a dynamic antenna tuning circuit that uses a dual directional coupler to measure reflected power. The reflected power may correspond to a measure of a radio frequency impedance mismatch that indicates power loss within the device. Compared with other uplink metrics, such as percentage of transmitting power, the reflected power may be independent of a base station implementation and may thus provide a more accurate measurement of an uplink connection from the perspective of the device.

In yet other implementations, both downlink metrics and uplink metrics may be used together. For example, if at least one of a short-term antenna downlink metric difference is greater than a short-term downlink threshold, a mid-term antenna downlink metric difference is greater than a mid-term downlink threshold, or a long-term antenna downlink metric difference is greater than a long-term downlink threshold, and if at least one of a short-term antenna uplink metric difference is greater than a short-term uplink threshold, a mid-term antenna uplink metric difference is greater than a mid-term uplink threshold, or a long-term antenna uplink metric difference is greater than a long-term uplink threshold, the device may switch the transmitting and non-transmitting antennas.

Implementations described herein further relate to triggering transmit antenna switching when an uplink connection is in danger of being dropped. If the device determines that it is operating at maximum transmitting power and determines that a particular uplink metric for the transmitting antenna is greater than a performance threshold while the wireless communication device is at maximum transmitting power, the device may perform transmit antenna switching as a last resort in an attempt to improve the uplink connection.

FIG. 1 is a diagram of an exemplary environment 100 in which the systems and/or methods, described herein, may be implemented. As shown in FIG. 1, environment 100 may include a user equipment (UE) 110, an access network 130, and a core network 140.

UE 110 may include a mobile communication device (e.g., a mobile phone, a smart phone, a phablet device, a wearable computer device (e.g., a head-mounted display computer device, a wristwatch computer device, etc.), a global positioning system (GPS) device, and/or another type of wireless device); a laptop computer, a tablet computer, or another type of portable computer; a media playing device; a portable gaming system; and/or any other type of mobile computer device with communication capabilities.

In some implementations, UE 110 may correspond to an embedded wireless device that communicates wirelessly with other devices over a machine-to-machine interface. For example, UE 110 may be electrically connected to any electronic device with a microcontroller, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. UE 110 may include a SIM card (not shown in FIG. 1). The SIM card may store information for one or more subscriptions that may be activated for UE 110. UE 110 may wirelessly communicate with access network 130.

Access network 130 may provide access to core network 140 for wireless devices, such as UE 110. Access network 130 may enable UE 110 to provide mobile telephone service and/or data services to UE 110. Access network 130 may include a base station 135 and UE 110 may wirelessly communicate with access network 130 via base station 135. Access network 130 may establish a packet data network connection between UE 110 and core network 140. For example, access network 130 may establish an Internet Protocol (IP) connection between UE 110 and core network 140.

In some implementations, access network 130 may include a Long Term Evolution (LTE) access network (e.g., an evolved packet core (EPC) network) based on the LTE standard specified by the 3$^{rd}$ Generation Partnership Project (3GPP) and base station 135 may include an eNodeB base station. The LTE access network may include one or more devices that implement logical entities interconnected via standardized interfaces and that provide packet-switched services between UE 110 and core network 140.

In other implementations, access network 130 may include a Code Division Multiple Access (CDMA) access network based on, for example, a CDMA2000 standard, and base station 135 may include a CDMA base station. For example, the CDMA access network may include a CDMA one times radio transmission technology (1×RTT) network, a CDMA High Rate Packet Data (HRPD) network (which may include a CDMA evolution optimized data only (EV-DO) network), or a CDMA eHRPD network (which may provide access to an LTE access network).

In yet other implementations, access network 130 may include a Global System for Mobile Communications (GSM) access network based on a GSM standard and base station 135 may include a GSM base station. For example, the GSM access network may include a General Packet Radio Service (GPRS) network, an Enhanced Data Rates for GSM Evolution (EDGE) network, a Universal Mobile Telecommunications System (UMTS) network (also known as a wideband CDMA (W-CDMA) network), or a High Speed Packet Access (HSPA) network.

Core network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 140 may allow the delivery of Internet Protocol (IP) services to UE 110, and may interface with other external networks. Core network 140 may include one or more server devices and/or network devices, or other types of computation or communication devices. In one example implementation, core network 140 may include an Internet Protocol Multimedia Subsystem (IMS) network (not shown in FIG. 1). An IMS network may include a network for delivering IP multimedia services as specified by 3GPP and may provide media flows between UE device 110 and external IP networks or external circuit-switched networks (not shown in FIG. 1).

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
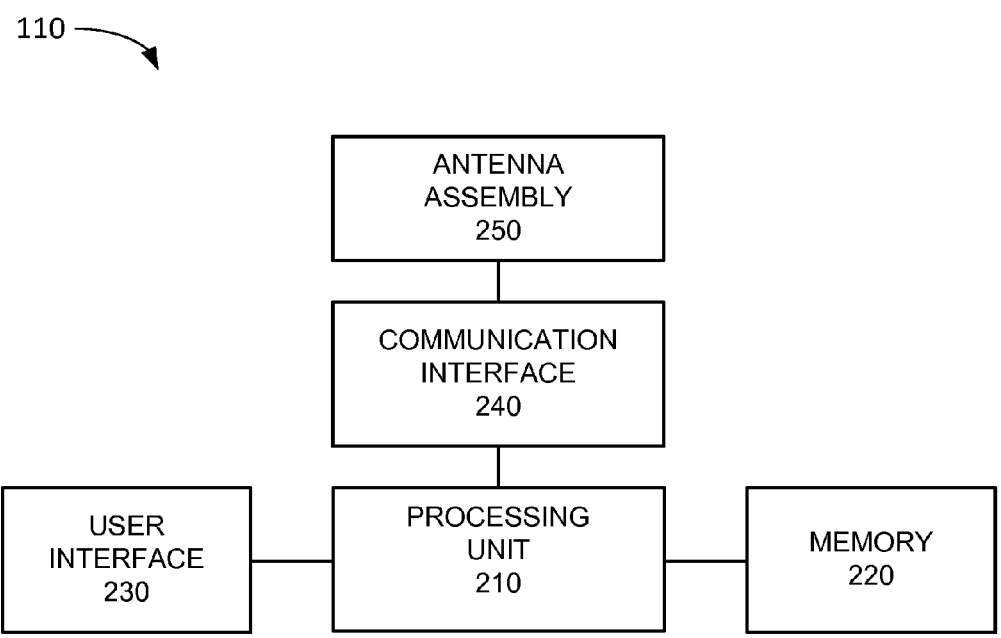
FIG. 2 is a first diagram illustrating exemplary components of the user equipment of FIG. 1.

FIG. 2 is a first diagram illustrating example components of UE 110 according to an implementation described herein. As shown in FIG. 2, UE 110 may include a processing unit 210, a memory 220, a user interface 230, a communication interface 240, and an antenna assembly 250.

Processing unit 210 may include one or more processors, microprocessors, application specific integrated circuits (ASICs), field programmable gate arrays (FPGAs), and/or other processing logic. Processing unit 210 may control operation of UE 110 and its components.

Memory 220 may include a random access memory (RAM) or another type of dynamic storage device, a read only memory (ROM) or another type of static storage device, a removable memory card, and/or another type of memory to store data and instructions that may be used by processing unit 210.

User interface 230 may allow a user to input information to UE 110 and/or to output information from UE 110. Examples of user interface 230 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as a liquid crystal display (LCD), to output visual information; an actuator to cause device 200 to vibrate; and/or any other type of input or output device.

Communication interface 240 may include a transceiver that enables UE 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 240 may include a transmitter that converts baseband signals to radio frequency (RF) signals and/or a receiver that converts RF signals to baseband signals. Communication interface 240 may be coupled to antenna assembly 250 for transmitting and receiving RF signals.

Communication interface 240 may include a logical component that includes input and/or output ports, input and/or output systems, and/or other input and output components that facilitate the transmission of data to other devices. For example, communication interface 240 may include a network interface card (e.g., Ethernet card) for wired communications and/or a wireless network interface (e.g., a WiFi) card for wireless communications. Communication interface 240 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 250 may include multiple antennas to transmit and/or receive RF signals. Antenna assembly 250 may, for example, receive RF signals from communication interface 240 and transmit the signals to base station 135 and receive RF signals from base station 135 and provide them to communication interface 240.

As described herein, UE 110 may perform certain operations in response to processing unit 210 executing software instructions contained in a computer-readable medium, such as memory 220. A computer-readable medium may be defined as a non-transitory memory device. A non-transitory memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 2 shows example components of UE 110, in other implementations, UE 110 may include fewer components, different components, differently arranged components, or additional components than depicted in FIG. 2. Additionally or alternatively, one or more components of UE 110 may perform the tasks described as being performed by one or more other components of UE 110.

Figure 3:
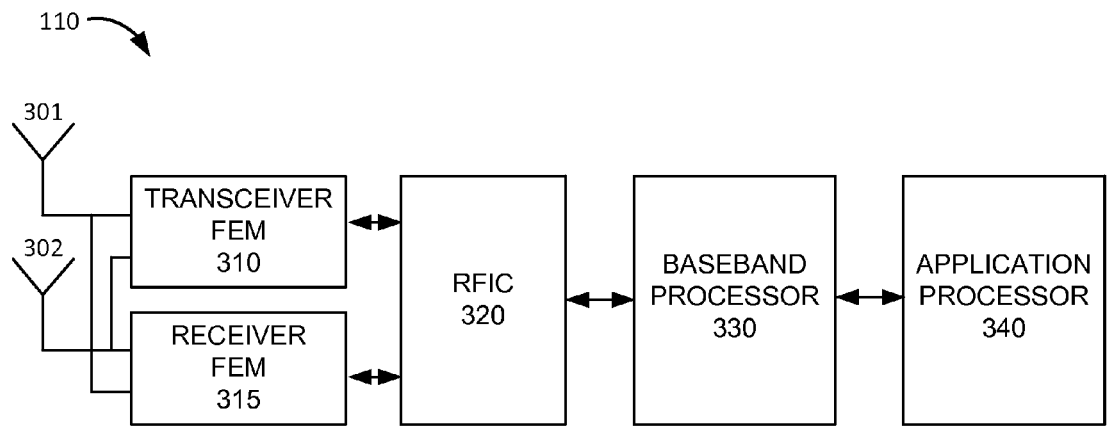
FIG. 3 is a second diagram illustrating exemplary components of the user equipment of FIG. 1.

FIG. 3 is a second diagram illustrating exemplary components of UE 110 according to an implementation described herein. As shown in FIG. 3, UE 110 may include a first antenna 301, a second antenna 302, a transceiver front end module (FEM) 310, a receiver FEM 315, a radio frequency integrated circuit (RFIC) 320, a baseband processor 330, and an application processor 340.

First antenna 301 and second antenna 302 may be included in antenna assembly 250. First antenna 301 and second antenna 302 may be located at different locations within UE 110 (or outside UE 110) and may receive wireless signals from base station 135 using a MIMO scheme in a particular communication frequency band. Furthermore, one of first antenna 301 and second antenna 302 may be selected as the transmitting antenna until UE 110 selects to switch transmitting antenna, at which point the other one of first antenna 301 and second antenna 302 may be selected as the transmitting antenna. While two antennas are shown in FIG. 3, in other implementations, UE 110 may include a different number of multiple antennas. For example, if UE 110 corresponds to a tablet computer, UE 110 may include four antennas. Furthermore, UE 110 may include an additional set of antennas for a different frequency band.

Transceiver FEM 310 may include both a receive chain and a transmit chain. For example, transceiver FEM 310 may be connected to both antenna 301 and antenna 302 and may include a first power amplifier for amplifying received signals and a second power amplifier for amplifying signals to be transmitted. Furthermore, transceiver FEM 310 may include an impedance matching circuit to match the input or output impedance of a receiving or transmitting circuit to the impedance of the antenna, and/or a mixer to mix incoming signals with signals from a local oscillator to convert the received signals to an intermediate frequency and/or mix outgoing signals from an intermediate frequency to a transmitting frequency. Transceiver FEM 310 may be configurable to select one of antenna 301 or antenna 302 as the transmit antenna and designate the selected antenna as the transmit antenna as well as the primary receive antenna. The other antenna may be designated as the diversity receive antenna. For example, RFIC 320, baseband processor 330, and/or application processor 340 may instruct transceiver FEM 310 to select either antenna 301 or antenna 302 as the transmit antenna.

Receiver FEM 315 may include a receive chain. Receiver FEM 315 may include, for example, an impedance matching circuit to match the input or output impedance of a receiving to the impedance of the antenna, an amplifier to amplify received signals, and/or a mixer to mix incoming signals with signals from a local oscillator to convert the received signals to an intermediate frequency. Receiver FEM 315 may be connected to both antenna 301 and antenna 302. When transceiver FEM 310 selects one of antenna 301 or antenna 302 as the transmit antenna, receiver REM 315 may designate the other one of antenna 301 or antenna 302 as the diversity receive antenna.

RFIC 320 may include an integrated circuit to down convert signals from an intermediate frequency to a baseband frequency. Baseband processor 330 may perform real-time processing on received signals, or signals which are to be transmitted, such as signal modulation/demodulation, encoding, RF shifting, error correction, and/or other types of baseband operations. RFIC 320 and/or baseband processor 330 may be configured to receive and process signals from multiple antennas within a particular time interval (e.g., from both first antenna 301 and second antenna 302 using a MIMO scheme) and may be configured to select and use a single antenna for transmitting signals. Transceiver FEM 310, receiver FEM 315, RFIC 320, and/or baseband processor 330 may be part of communication interface 240 of UE 110. Application processor 340 may perform the main operations of UE 110. For example, application processor 340 may run an operating system and may run applications installed on UE 110. Application processor 340 may comprise part of processing unit 210 of UE 110.

Although FIG. 3 shows exemplary functional components of UE 110, in other implementations, UE 110 may include fewer components, different components, differently arranged components, or additional components than depicted in FIG. 3. Additionally or alternatively, one or more components of UE 110 may perform functions described as being performed by one or more other components of UE 110.

Figure 4:
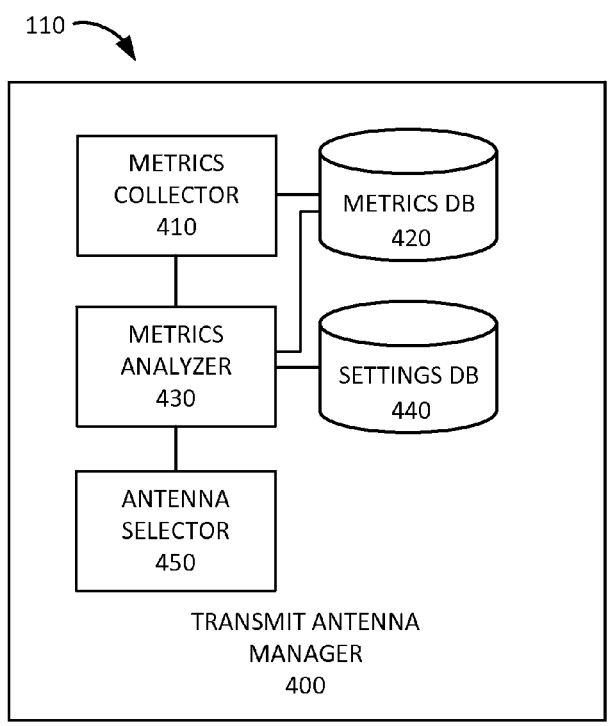
FIG. 4 is a diagram illustrating exemplary functional components of a transmit antenna manager of the user equipment of FIG. 1.

FIG. 4 is a diagram illustrating exemplary functional components of a transmit antenna manager 400 of UE 110. In some implementations, transmit antenna manager 400 may be implemented in RFIC 320. In other implementations, transmit antenna manager 400 may be implemented in baseband processor 330. In yet other implementations, transmit antenna manager 400 may be implemented in application processor 340. Transmit antenna manager 400 may manage which antenna (e.g., antenna 301 or antenna 302) is selected as the transmitting antenna based on metrics determined during a particular time interval. As shown in FIG. 4, transmit antenna manager 400 may include a metrics collector 410, a metrics database (DB) 420, a metrics analyzer 430, a settings DB 440, and an antenna selector 450.

Metrics collector 410 may collect one or more downlink metric measurements and/or one or more uplink metric measurements for antennas of device 110 (e.g., first antenna 301 and second antenna 302) during a particular time period and may store the collected metric measurements in metrics DB 420. Metrics DB 420 may store metrics obtained by metrics collector 410. Exemplary information that may be stored in metrics DB 420 is described below with reference to FIG. 5A.

Metrics analyzer 430 may analyze the metrics stored in metrics DB 420 based on information stored in settings DB 440. Settings DB 440 may store settings for calculating parameters used to select a transmitting antenna. Exemplary information that may be stored in settings DB 440 is described below with reference to FIG. 5B. Metrics analyzer 430 may compute particular metric differences and compute each particular metric difference to a particular threshold to determine whether the particular threshold has been exceeded and whether a particular transmit antenna switching condition has been satisfied. Metrics analyzer 430 may provide the results of the analysis of the metrics to antenna selector 450. Antenna selector 450 may select a transmitting antenna (e.g., antenna 301 or antenna 302) based on information calculated by metrics analyzer 430. Signals to be transmitted from UE 110 to base station 135 may be processed and transmitted using the selected transmitting antenna.

Although FIG. 4 show exemplary functional components of transmit antenna manager 400, in other implementations, transmit antenna manager 400 may include fewer functional components, different functional components, differently arranged functional components, or additional functional components than depicted in FIG. 4. Additionally or alternatively, one or more functional components of transmit antenna manager 400 may perform functions described as being performed by one or more other functional components of transmit antenna manager 400.

Figure 5A:
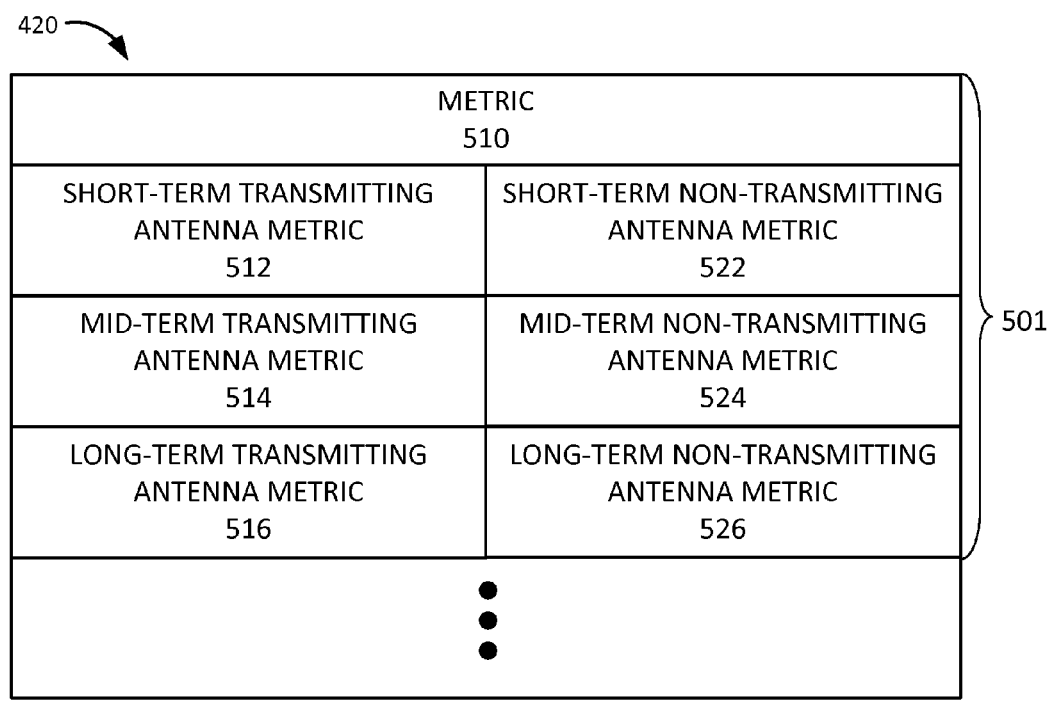
FIG. 5A is a diagram illustrating exemplary components that may be stored in the metrics database of FIG. 4.

FIG. 5A is a diagram illustrating exemplary components that may be stored in metrics DB 420. As shown in FIG. 5A, metrics DB 420 may include one or more metric records 501. Each metric record 501 may store metric values for a particular metric used in selecting a transmitting antenna. For example, a first metric record 501 may store metric values for a first downlink metric (e.g., a downlink pathloss measurement), a second metric record 501 may store metric values for a second downlink metric (e.g., an RSRP measurement), a third metric record 501 may store metric values for a first uplink metric (e.g., an antenna reflected power measurement), a fourth metric record 501 may store metric values for a second uplink metric (e.g., an uplink throughput measurement), etc. Each metric record 501 may include a short-term transmitting antenna metric field 512, a mid-term transmitting antenna metric field 514, a long-term transmitting antenna metric field 516, a short-term non-transmitting antenna metric field 522, a mid-term non-transmitting antenna metric field 524, and a long-term non-transmitting antenna metric field 526.

Short-term transmitting antenna metric field 512 may store a determined short-term value for the particular metric for the transmitting antenna. Mid-term transmitting antenna metric field 514 may store a determined mid-term value for the particular metric for the transmitting antenna. Long-term transmitting antenna metric field 516 may store a determined long-term value for the particular metric for the transmitting antenna. Short-term non-transmitting antenna metric field 522 may store a determined short-term value for the particular metric for the non-transmitting antenna. Mid-term non-transmitting antenna metric field 524 may store a determined mid-term value for the particular metric for the non-transmitting antenna. Long-term non-transmitting antenna metric field 526 may store a determined long-term value for the particular metric for the non-transmitting antenna.

Although FIG. 5A show exemplary fields that may be stored in metrics DB 420, in other implementations, metrics DB 420 may store fewer fields, different fields, differently arranged fields, or additional fields than depicted in FIG. 5A.

FIG. 5B is a diagram illustrating exemplary components that may be stored in settings DB 440. As shown in FIG. 5B, settings DB 440 may include a filtering coefficients field 550, a switching frequency constant field 560, and a thresholds field 570.

Filtering coefficients field 550 may include one or more filtering coefficients that are used to determine the length of the time periods used to determine the metric values for the transmitting and non-transmitting antennas. For example, filtering coefficients field 550 may include a $T_0$ field 552, a $T_1$ field 554, a $T_2$ field 556, and a $T_3$ field 558. $T_0$ field 552 may store a $T_0$ value for the length of measurement interval (e.g., 0.5 seconds, 1 second, etc.). Thus, metric values may be determined for each measurement interval. $T_1$ field 554 may store a $T_1$ filtering coefficient that is used to determine short-term metric values. $T_2$ field 556 may store a $T_2$ filtering coefficient that is used to determine mid-term metric values. $T_3$ field 558 may store a $T_3$ filtering coefficient that is used to determine long-term metric values.

Switching frequency constant field 560 may store a switching constant that controls how frequently to switch or potentially switch the transmitting antenna. The switching constant may be used to estimate uplink metric values for the non-transmitting antenna. Thresholds field 570 may store threshold values used to satisfy particular conditions in determining whether to perform transmit antenna switching. For example, thresholds field 570 may include a TH-$D_1$ field 572, a TH-$D_2$ field 574, a TH-$D_3$ field 576, a TH-$U_1$ field 582, a TH-$U_2$ field 584, a TH-$U_3$ field 586, a TH-$D_L$ field 590, and a TH-$D_H$ field 592.

TH-$D_1$ field 572 may store a short-term downlink metric threshold (TH-$D_1$). TH-$D_2$ field 574 may store a mid-term downlink metric threshold (TH-$D_2$). TH-$D_3$ field 576 may store a long-term downlink metric threshold (TH-$D_3$). TH-$U_1$ field 582 may store a short-term uplink metric threshold (TH-$U_1$). TH-$U_2$ field 584 may store a mid-term uplink metric threshold (TH-$U_2$). TH-$U_3$ field 586 may store a long-term uplink metric threshold (TH-$U_3$). TH-$D_L$ field 590 may store a low downlink metric threshold (TH-$D_L$) and TH-$D_H$ field 592 may store a high downlink metric threshold (TH-$D_H$). The low and high downlink thresholds may be used in some applications to ensure that a downlink metric value is within a particular range so that transmit antenna switching is only applied within the particular range.

Although FIG. 5B show exemplary fields that may be stored in settings DB 440, in other implementations, settings DB 440 may store fewer fields, different fields, differently arranged fields, or additional fields than depicted in FIG. 5B. For example, in some implementations, metrics DB 420 may store a history and timing of previous transmit antenna switching decisions. Transmit antenna manager 400 may, in some implementations, change parameters stored in settings DB 440 based on the history and/or frequency of previous antenna switching decisions. Furthermore, transmit antenna manager 400 may, in some implementations, anticipate transmit antenna switching to a particular antenna based on the history of previous transmit antenna switching decisions, such as during a particular time of day or a particular day of week.

Figure 6:
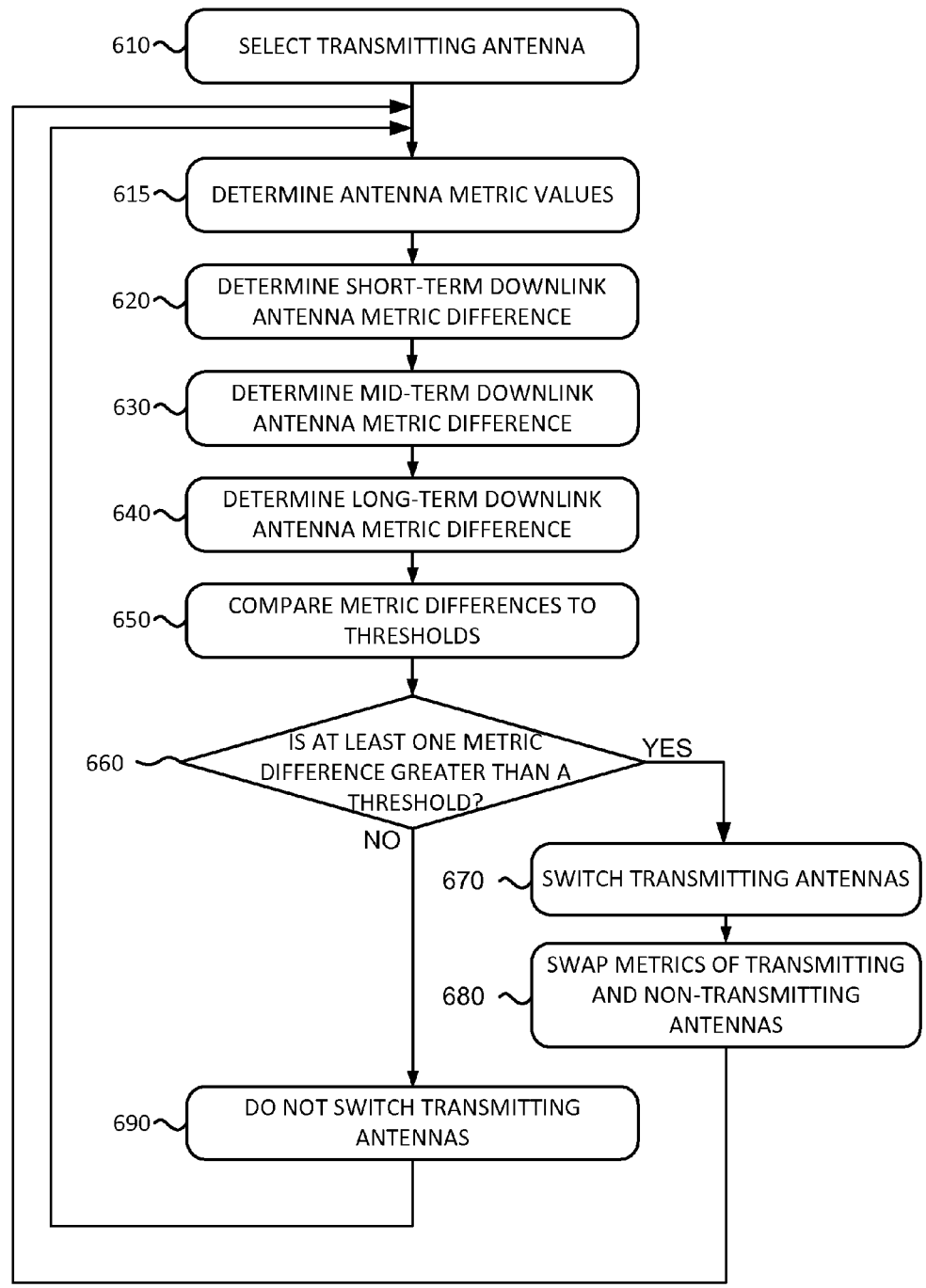
FIG. 6 is a flowchart of a first exemplary process to select a transmit antenna according to an implementation described herein.

FIG. 6 is a flowchart of a first exemplary process to select a transmit antenna according to an implementation described herein. In the process of FIG. 6, downlink metrics are used to determine when to perform transmit antenna switching. In some implementations, the process of FIG. 6 may be performed by UE 110. In other implementations, some or all of the process of FIG. 6 may be performed by another device or a group of devices separate from UE 110 or including UE 110.

The process of FIG. 6 may include selecting a transmitting antenna (block 610). For example, transmit antenna manager 400 may select a transmitting antenna (e.g., antenna 301 or antenna 302) when UE 110 selects to attach to access network 130. Transmit antenna manager 400 may select a transmitting antenna initially based on a default setting, based on an initial measurement of a particular uplink and/or downlink metric, and/or based on another criterion.

Antenna metric values may be determined (block 615). For example, metrics collector 410 may obtain metric values and metrics analyzer 430 may determine additional metric values based on the obtained metric values. If the selected downlink metric is designated as Md, and if the transmitting antenna is designated as antenna 0 and the non-transmitting antenna is designated as antenna 1, the downlink metric measurement for the transmitting antenna may be designated as $Md_0$ and the downlink measurement for the non-transmitting antenna may be designated as $Md_1$. Furthermore, as in filtering coefficients field 550 of settings DB 440, let the measurement interval be designated as $T_0$, let a short-term filtering coefficient be designated as $T_1$, let a mid-term filtering coefficient be designated as $T_2$, and let a long-term filtering coefficient be designated as $T_3$. Setting an index k to run from 0 to 1, where 0 represents transmitting antenna 0 and where 1 represents non-transmitting antenna 1, and setting an index i to run from 1 to 3, where 1 represents the short-term time interval, 2 represents the mid-term time interval, and 3 represents the long-term time interval, the downlink metrics may be determined using the following equation:

$$\overline{M}d_{k,i}(n) = \left(1 - \frac{T_0}{T_i}\right) * \overline{M}d_{k,i}(n-1) + \frac{T_0}{T_i} * Md_k(n) \quad (1)$$

In Equation 1, n represents time interval n (e.g., the nth measurement of the downlink metric. Thus, at time interval n, the downlink metric $Md_{k,i}$ is determined as a weighted sum of the current downlink measurement for the respective antenna and a previous measurement of downlink metric $Md_{k,i}$ at time n−1. The weights are based on a ratio of the length of the measurement interval and the respective filtering coefficient. Thus, Equation 1 may be used to determine six downlink metrics in an implementation with one non-transmitting antenna and three different filtering coefficients: a short-term transmitting downlink antenna metric $Md_{0,1}$, a mid-term transmitting downlink antenna metric $Md_{0,2}$, a long-term transmitting downlink antenna metric $Md_{0,3}$, a short-term non-transmitting downlink antenna metric $Md_{1,1}$, a mid-term non-transmitting downlink antenna metric $Md_{1,2}$, and a long-term non-transmitting downlink antenna metric $Md_{1,3}$.

In other implementations, a different number of time intervals and filtering coefficients may be used to compute downlink metrics (e.g., a short-term downlink metric and a long-term downlink metric; four different downlink metrics, etc.) and thus index i may extend over a different set of numbers. Furthermore, if UE 110 includes more than two antennas, downlink metrics may be determined for multiple non-transmitting antennas and index k may extend over a different set of numbers.

After the downlink metrics are determined, the process of FIG. 6 may continue to determine a short-term downlink antenna metric difference (block 620), to determine a mid-term downlink antenna metric difference (block 630), and to determine a long-term downlink antenna metric difference (block 640). For example, metrics analyzer 430 may use the following equation to determine the downlink metric differences:

$$\Delta \overline{M}d_i = \overline{M}d_{1,i} - \overline{M}d_{0,i} \quad (2)$$

A determination may be made as to whether at least one of the metric differences is greater than an associated threshold (blocks 650 and 660). For example, metrics analyzer 430 may compare the determined short-term downlink antenna metric difference, the determined mid-term downlink antenna metric difference, and the determined long-term downlink antenna metric difference to thresholds stored in thresholds field 570 to determine whether Condition (3) below is true:

$$((\Delta \overline{M}d_1 > thd_1) OR (\Delta \overline{M}d_2 > thd_2) OR (\Delta \overline{M}d_3 > thd_3)) \quad (3)$$

If Condition (3) is satisfied (block 660—YES), transmitting antennas may be switched (block 670) and the metrics of the transmitting and non-transmitting antennas may be swapped (block 680). For example, if antenna 301 is the transmitting antenna and antenna 302 is the non-transmitting antenna, antenna selector 450 may designate and switch antenna 302 to be the transmitting antenna and antenna 301 to be the non-transmitting antenna. Furthermore, the metric fields in metric records 501 of metrics DB 420 may be swapped. After transmit antenna switching is performed and the metrics of the antennas are switched, processing may return to block 615 to determine the antenna metric values for the next measurement interval. If Condition (3) is not satisfied (block 660—NO), transmitting antennas may not be switched (block 690) and processing may return to block 615 to determine the antenna metric values for the next measurement interval.

Figure 7:
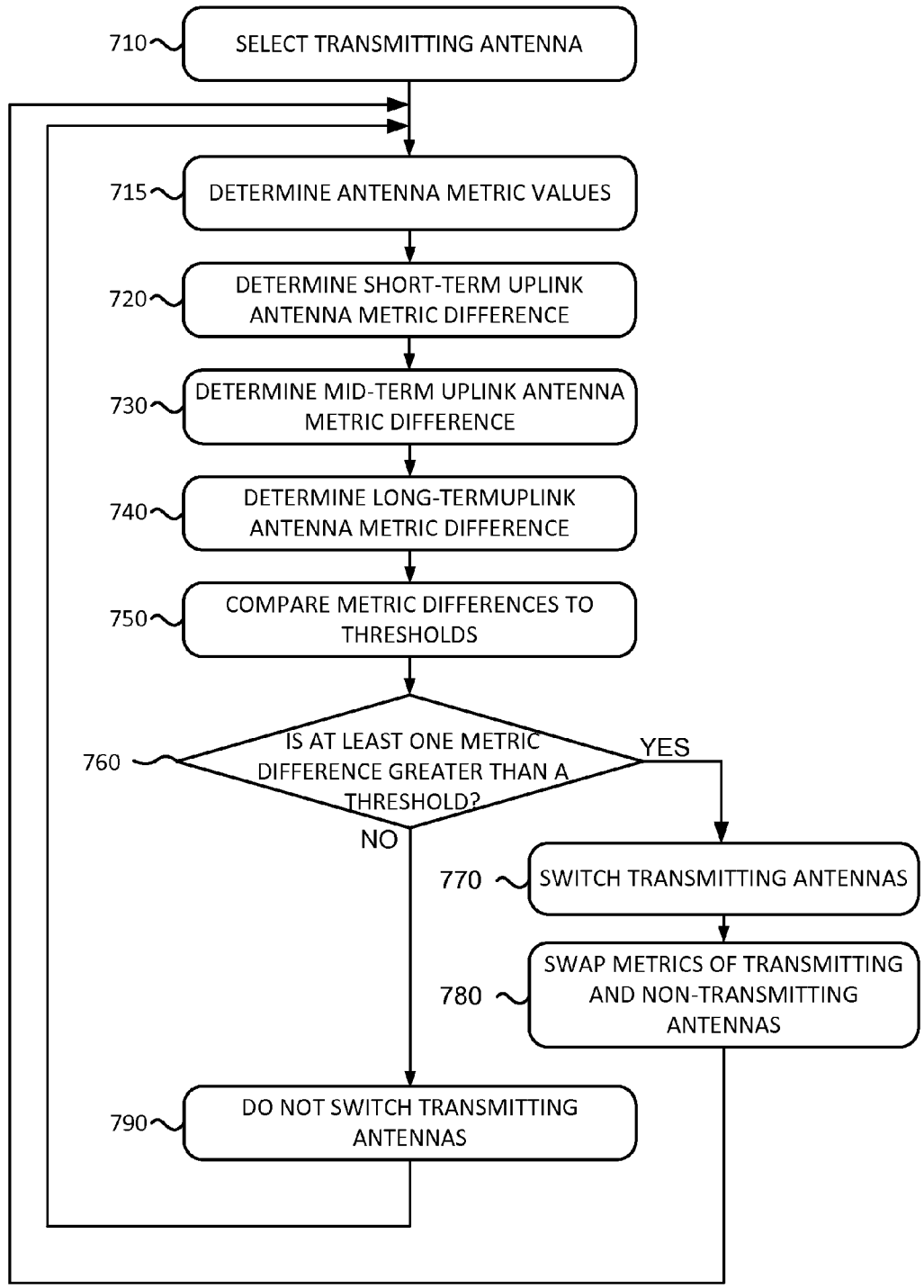
FIG. 7 is a flowchart of a second exemplary process to select a transmit antenna according to an implementation described herein.

FIG. 7 is a flowchart of a second exemplary process to select a transmit antenna according to an implementation described herein. In the process of FIG. 7, uplink metrics are used to determine when to perform transmit antenna switching. In some implementations, the process of FIG. 7 may be performed by UE 110. In other implementations, some or all of the process of FIG. 7 may be performed by another device or a group of devices separate from UE 110 or including UE 110.

The process of FIG. 7 may include selecting a transmitting antenna (block 710). For example, transmit antenna manager 400 may select a transmitting antenna (e.g., antenna 301 or antenna 302) when UE 110 selects to attach to access network 130. Transmit antenna manager 400 may select a transmitting antenna initially based on a default setting, based on an initial measurement of a particular uplink and/or downlink metric, and/or based on another criterion.

Antenna metric values may be determined (block 715). For example, metrics collector 410 may obtain metric values and metrics analyzer 430 may determine additional metric values based on the obtained metric values. If the selected uplink metric is designated as Mu, and if the transmitting antenna is designated as antenna 0 and the non-transmitting antenna is designated as antenna 1, the uplink metric measurement for the transmitting antenna may be designated as $Mu_0$ and the uplink estimate for the non-transmitting antenna may be designated as $Mu_1$. Since no uplink metric measurements are available for the non-transmitting antenna, the uplink metrics for the non-transmitted antenna may need to be estimated based on the measurements obtained before the last antenna switching was performed.

Similarly to Equation (1) above, let the measurement interval be designated as $T_0$, let a short-term filtering coefficient be designated as $T_1$, let a mid-term filtering coefficient be designated as $T_2$, and let a long-term filtering coefficient be designated as $T_3$. Setting an index i to run from 1 to 3, where 1 represents the short-term time interval, 2 represents the mid-term time interval, and 3 represents the long-term time interval, the uplink metrics for the transmitting antenna may be determined using the following equation:

$$\overline{M}u_{0,i}(n) = \left(1 - \frac{T_0}{T_i}\right) * \overline{M}u_{0,i}(n-1) + \frac{T_0}{T_i} * Mu_0(n) \quad (4)$$

In Equation 4, n represents time interval n (e.g., the nth measurement of the downlink metric. Thus, at time interval n, the uplink metric $Mu_{0,i}$ for the transmitting antenna is determined as a weighted sum of the current uplink measurement for the transmitting antenna and a previous measurement of the uplink metric $Mu_{0,i}$ at time n−1. The weights are based on a ratio of the length of the measurement interval and the respective filtering coefficient. Thus, Equation (4) may be used to determine three uplink metrics in an implementation with three different filtering coefficients: a short-term transmitting uplink antenna metric $Mu_{0,1}$, a mid-term transmitting uplink antenna metric $Mu_{0,2}$, and a long-term transmitting uplink antenna metric $Md_{0,3}$.

The estimate for the uplink metric for the non-transmitting antenna $\overline{Mu}_{1,i}$ may be initialized to $\overline{Mu}_{0,i}$ and may take the measurement value at the time of the last transmit antenna switching. At each subsequent time, a boosting factor may be applied to $\overline{Mu}_{1,i}$ to help trigger the sampling of uplink measurement on the non-transmitting antenna based on the following equation:

$$\overline{Mu}_{1,i}(n) = \left(1 + \frac{T_0}{c * T_i}\right) * \overline{Mu}_{1,i}(n-1) \quad (5)$$

In Equation (5), c may correspond to a value stored in switching frequency constant field 560 of settings DB 440 and may be set based on how frequently transmit antenna switching should occur.

In other implementations, a different number of time intervals and filtering coefficients may be used to computer uplink metrics (e.g., a short-term uplink metric and a long-term uplink metric; four different uplink metrics, etc.) and thus index i may extend over a different set of numbers. Furthermore, if UE 110 includes more than two antennas, uplink metrics may be estimated for multiple non-transmitting antennas and index k may extend over a different set of numbers.

After the uplink metrics are determined, the process of FIG. 7 may continue to determine a short-term uplink antenna metric difference (block 720), to determine a mid-term uplink antenna metric difference (block 730), and to determine a long-term uplink antenna metric difference (block 740). For example, metrics analyzer 430 may use the following equation to determine the uplink metric differences:

$$\Delta \overline{Mu}_i = \overline{Mu}_{1,i} - \overline{Mu}_{0,i} \quad (6)$$

A determination may be made as to whether at least one of the metric differences is greater than an associated threshold (blocks 750 and 760). For example, metrics analyzer 430 may compare the determined short-term uplink antenna metric difference, the determined mid-term uplink antenna metric difference, and the determined long-term uplink antenna metric difference to thresholds stored in thresholds field 570 to determine whether Condition (7) below is true:

$$((\Delta \overline{Mu}_1 > thu_1) \text{OR} (\Delta \overline{Mu}_2 > thu_2) \text{OR} (\Delta \overline{Mu}_3 > thu_3)) \quad (7)$$

If Condition (7) is satisfied (block 760—YES), transmitting antennas may be switched (block 770) and the metrics of the transmitting and non-transmitting antennas may be swapped (block 780). For example, if antenna 301 is the transmitting antenna and antenna 302 is the non-transmitting antenna, antenna selector 450 may designate and switch antenna 302 to be the transmitting antenna and antenna 301 to be the non-transmitting antenna. Furthermore, the metric fields in metric records 501 of metrics DB 420 may be swapped. After transmit antenna switching is performed and the metrics of the antennas are switched, processing may return to block 715 to determine the antenna metric values for the next measurement interval. If Condition (7) is not satisfied (block 760—NO), transmitting antennas may not be switched (block 790) and processing may return to block 715 to determine the antenna metric values for the next measurement interval.

Figure 8:
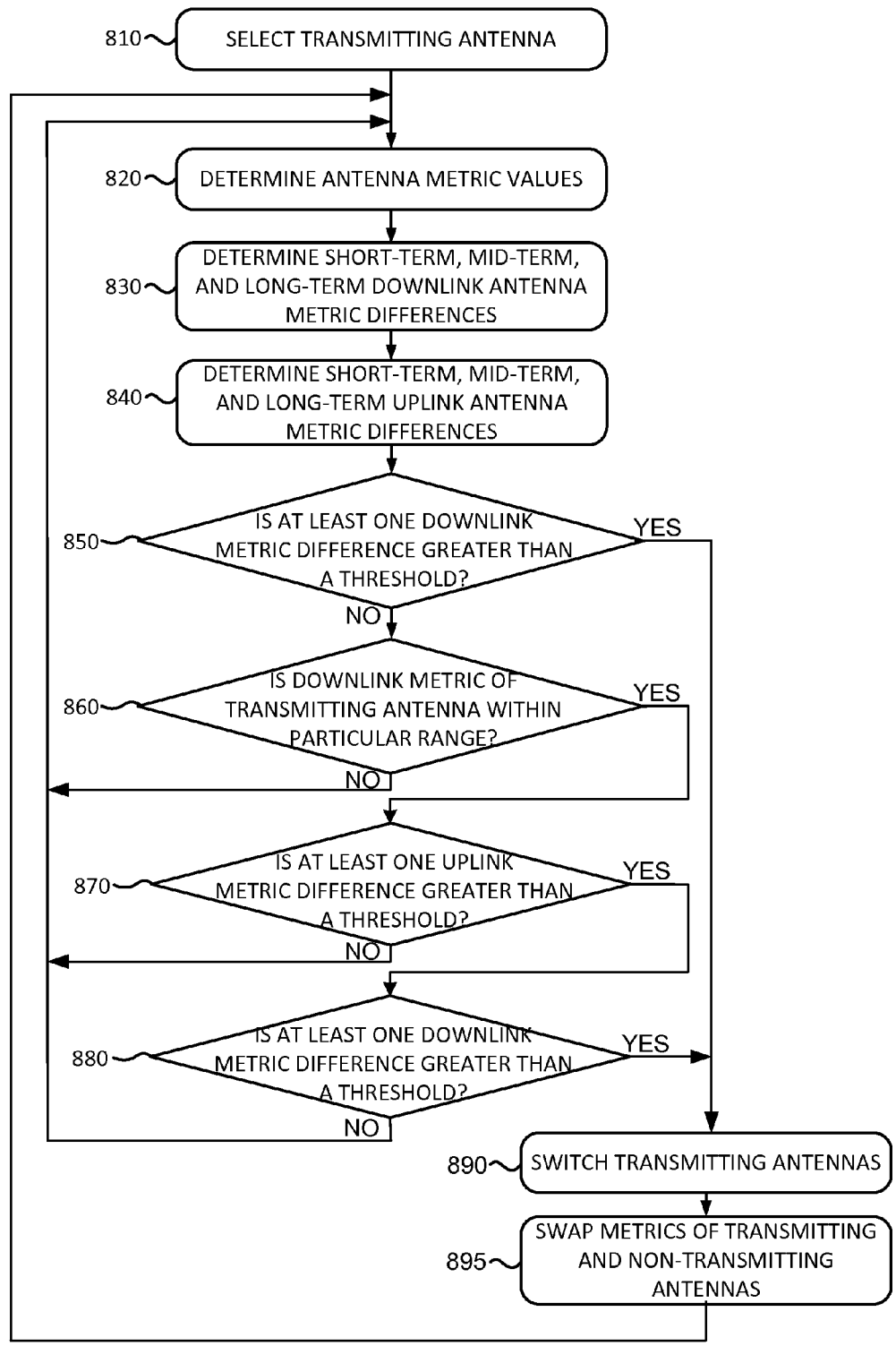
FIG. 8 is a flowchart of a third exemplary process to select a transmit antenna according to an implementation described herein.

FIG. 8 is a flowchart of a third exemplary process to select a transmit antenna according to an implementation described herein. In the process of FIG. 8, both downlink and uplink metrics are used to determine when to perform transmit antenna switching. In some implementations, the process of FIG. 8 may be performed by UE 110. In other implementations, some or all of the process of FIG. 8 may be performed by another device or a group of devices separate from UE 110 or including UE 110.

The process of FIG. 8 may include selecting a transmitting antenna (block 810). For example, transmit antenna manager 400 may select a transmitting antenna (e.g., antenna 301 or antenna 302) when UE 110 selects to attach to access network 130. Transmit antenna manager 400 may select a transmitting antenna initially based on a default setting, based on an initial measurement of a particular uplink and/or downlink metric, and/or based on another criterion.

Antenna metric values may be determined (block 820). For example, metrics collector 410 may obtain metric values and metrics analyzer 430 may determine additional metric values based on the obtained metric values. Metrics analyzer 430 may determine downlink metric values using Equation (1) as described above with reference to FIG. 6. Furthermore, metrics analyzer 430 may determine uplink metric values for the transmitting antenna using Equation (4) and may estimate the uplink metric values for the non-transmitting antenna using Equation (5) as described above with reference to FIG. 7.

After the uplink metrics are determined, the process of FIG. 8 may continue to determine a short-term downlink antenna metric difference, a mid-term downlink antenna metric difference, and a long-term downlink antenna metric difference (block 830), and to determine a short-term uplink antenna metric difference, a mid-term uplink antenna metric difference, and a long-term uplink antenna metric difference (block 840). For example, metrics analyzer 430 may determine the downlink antenna metric differences using Equation (2) as described above with reference to FIG. 6, and may determine the uplink antenna metric differences using Equation (6) as described above with reference to FIG. 7.

A determination may be made as to whether at least one downlink metric difference is greater than a threshold (block 850). For example, metrics analyzer 430 may compare the determined short-term downlink antenna metric difference, the determined mid-term downlink antenna metric difference, and the determined long-term downlink antenna metric difference to thresholds stored in thresholds field 570 to determine whether Condition (3) is true as described above with reference to FIG. 6. An initial comparison using the downlink metric differences may provide a gross or first level criterion for antenna switching before a more finely-tuned determination is made. Thus, if the downlink metrics on the non-transmitting antenna are significantly better than the downlink metrics on the transmitting antenna, transmit antenna switching may be performed. Therefore, if Condition (3) is satisfied (block 850—YES), processing may continue to blocks 890 and 895 to switch the transmitting antenna and to swap the metrics for the transmitting and non-transmitting antennas.

If Condition (3) is not satisfied (block 850—NO), processing may continue to determine whether the downlink metric for the transmitting antenna is within a particular range (block 860). For example, metrics analyzer 430 may compare the current (i.e., at time interval n) metric measurement value to the high and low thresholds stored in TH-D$_L$ field 590 and TH-D$_H$ 592 of settings DB 440 to determine whether Condition (8) is true:

$$(Thd_L < \overline{M}d_0(n) < Thd_H) \tag{8}$$

Condition (8) may put constraints on particular RF conditions, so that transmit antenna switching based on a particular uplink metric is applied to the particular RF conditions. As an example, if the uplink metrics include an uplink throughput metric and there is no expectation of an uplink throughput difference except at a cell edge where the power of UE 110 is limited, the uplink metric difference determination would only be applied in situations where UE 110 is at the cell edge (in which cases Condition (8) would be satisfied). As another example, if power headroom is used as an uplink metric and if there is no expectation of a difference in power headroom when UE 110 is transmitting at maximum power, cell edge conditions may be excluded using Condition (8).

If Condition (8) is not satisfied (block 860—NO), transmitting antennas may not be switched and processing may return to block 820 to determine the antenna metric values for the next measurement interval. If Condition (8) is satisfied (block 860—YES), processing may continue to determine whether at least one uplink metric difference is greater than a threshold (block 870). For example, metrics analyzer 430 may compare the determined short-term uplink antenna metric difference, the determined mid-term uplink antenna metric difference, and the determined long-term uplink antenna metric difference to thresholds stored in thresholds field 570 to determine whether Condition (7) is true, as described above with reference to FIG. 7.

If Condition (7) is not satisfied (block 870—NO), transmitting antennas may not be switched and processing may return to block 820 to determine the antenna metric values for the next measurement interval. If Condition (7) is satisfied (block 870—YES), processing may continue to determine whether at least one downlink difference is greater than a threshold (block 880) using Condition (9) below:

$$((\Delta \overline{M}d_1 > thd_2) \text{OR} (\Delta \overline{M}d_2 > thd_3) \text{OR} (\Delta \overline{M}d_3 > -thd_3)) \tag{9}$$

Condition (9) being satisfied may be an indication that the downlink metrics are at a level that falls just short of triggering transmit antenna switching based on Condition (3) of block 850. With the additional uplink metrics information, transmit antenna switching may be enabled in a more aggressive manner (e.g., using additional information) than based on downlink metrics alone. The thresholds in Condition (9) are lower than the thresholds in Condition (3). Furthermore, for the long-term downlink metric difference, transmit antenna switching is allowed to occur even if the downlink metric for the non-transmitting antenna is slightly worse than the downlink metric for the transmitting antenna, provided that Condition (7) for the uplink metrics is satisfied.

If Condition (9) is not satisfied (block 880—NO), transmitting antennas may not be switched and processing may return to block 820 to determine the antenna metric values for the next measurement interval. If Condition (9) is satisfied (block 880—YES), processing may continue to block 890.

The transmitting antennas may be switched (block 890) and the metrics of the transmitting and non-transmitting antennas may be swapped (block 895). For example, if antenna 301 is the transmitting antenna and antenna 302 is the non-transmitting antenna, antenna selector 450 may designate and switch antenna 302 to be the transmitting antenna and designate and switch antenna 301 to be the non-transmitting antenna. Furthermore, the metric fields in metric records 501 of metrics DB 420 may be swapped. For example, metrics analyzer 430 may swap the values of $\overline{M}d_{0,i}(n)$ and $\overline{M}d_{1,i}(n)$ and may swap the values of $\overline{M}u_{0,i}(n)$ and $\overline{M}u_{1,i}(n)$ in metrics DB 420. After transmit antenna switching is performed and the metrics of the antennas are switched, processing may return to block 820 to determine the antenna metric values for the next measurement interval.

Furthermore, an additional transmit antenna switching condition may be applied for any of the processes of FIG. 6, FIG. 7, and/or FIG. 8. For example, a last resort scheme may be employed in addition to other antenna switching conditions, in which transmit antenna switching is performed if UE 110 is at maximum transmit power and if uplink performance is below a particular threshold as measured by one or more uplink metrics, such as a high residual BLER, radio link failure, an Out Of Synchronization condition caused by Scheduling Request (SR) maximum retransmission when the SR sent by UE 110 is not being detected by base station 135, and/or based on another type of uplink metric.

Figure 9:
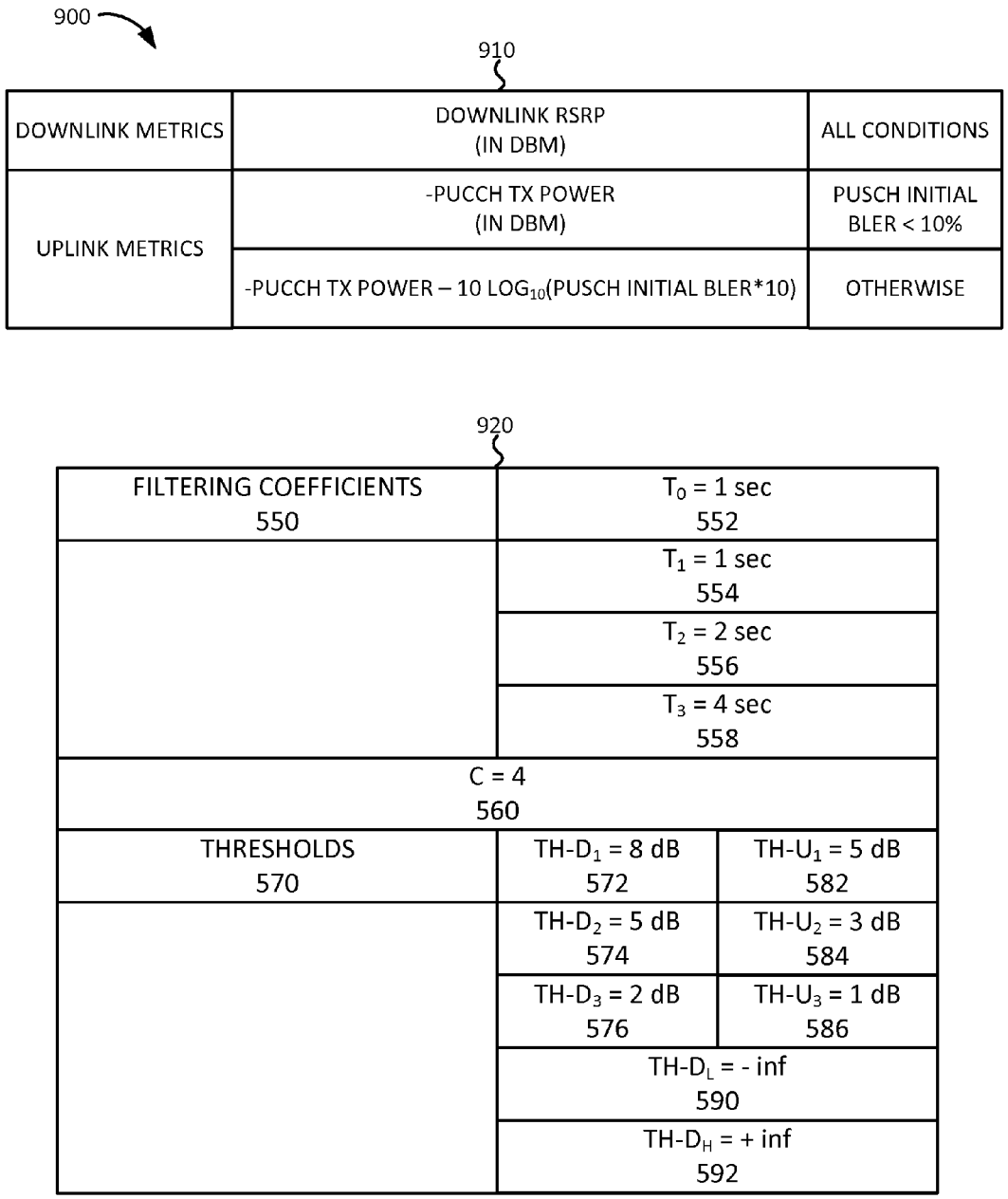
FIG. 9 is a diagram illustrating exemplary settings for selecting a transmit antenna according to an implementation described herein.

FIG. 9 is a diagram illustrating exemplary settings for selecting a transmit antenna according to an implementation described herein. The implementation shown in FIG. 9 may utilize both downlink and uplink settings together with the process of FIG. 8. As shown in FIG. 9, exemplary settings 900 may include metric selections 910 and settings 920.

Metric selections 910 may include a downlink RSRP downlink metric applied for all conditions. Metric selections 910 may include an uplink metric set to uplink negative Physical Uplink Control Channel (PUCCH) transmission (Tx) power in decibel milliwatts (dBm) for conditions when the Physical Uplink Shared Channel (PUSCH) has an initial BLER of less than 10%. For other conditions, the uplink metric may be set to −PUCCH Tx power−10 log$_{10}$(PUSCH initial BLUR*10).

Settings 910, which may be stored in settings DB 440 of UE 110, may include the measurement interval T$_0$ set to one second, the short-term filtering coefficient T$_1$ set to one second, the mid-term filtering coefficient T$_2$ set to two seconds, and the long-term filtering coefficient T$_3$ set to four seconds. Furthermore, settings 910 may include the switching frequency constant c to be set to 4 and may include the short-term downlink metric threshold TH-D$_1$ set to 8 dB, the mid-term downlink metric threshold TH-D$_2$ set to 5 dB, the long-term downlink metric threshold TH-D$_3$ set to 2 dB, the short-term uplink metric threshold TH-U$_1$ set to 5 dB, the mid-term uplink metric threshold TH-U$_2$ set to 3 dB, and the long-term uplink metric threshold TH-U$_3$ set to 1 dB. Furthermore, the low threshold TH-D$_L$ for Condition (8) may be set to −inf and the high threshold TH-D$_H$ for Condition (8) may be set to +inf, indicating that Condition (8) is not applied in this exemplary implementation.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while series of blocks have been described with respect to FIGS. 6-8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a wireless communication device, the method comprising:
   selecting, by the wireless communication device, a first antenna as a transmitting antenna and a second antenna as a non-transmitting antenna;
   calculating, by the wireless communication device, a short-term antenna metric difference between the transmitting antenna and the non-transmitting antenna, wherein the short-term antenna metric difference measures a difference in a metric over a first time period;
   calculating, by the wireless communication device, a long-term antenna metric difference between the transmitting antenna and the non-transmitting antenna, wherein the long-term antenna metric difference measures a difference in the metric over a second time period that is longer than the first time period;
   determining, by the wireless communication device, whether to switch the transmitting antenna and the non-transmitting antenna based on whether at least one of the calculated short-term antenna metric difference is greater than a short-term threshold or the long-term antenna metric difference is greater than a long-term threshold; and
   switching, by the wireless communication device, the second antenna to the transmitting antenna and the first antenna to the non-transmitting antenna, in response to determining to switch the transmitting antenna and the non-transmitting antenna.

2. The method of claim 1, further comprising:
   calculating a mid-term antenna metric difference between the transmitting antenna and the non-transmitting antenna, wherein the mid-term antenna metric difference measures a difference in the metric over a third time period that is longer than the first time period and shorter than the second time period; and wherein
   determining whether to switch the transmitting antenna and the non-transmitting antenna includes:
   determining whether to switch the transmitting antenna and the non-transmitting antenna based on whether the calculated mid-term antenna metric difference is greater than a mid-term threshold.

3. The method of claim 2, wherein the metric includes a downlink metric.

4. The method of claim 3, wherein calculating the short-term antenna metric difference between the transmitting antenna and the non-transmitting antenna includes:
   determining a first downlink metric value based on a combination of a current downlink metric value for the transmitting antenna and a previous downlink metric value for the transmitting antenna modified by a short-term filtering coefficient;
   determining a second downlink metric value based on a combination of a current downlink metric value for the non-transmitting antenna and a previous downlink metric value for the non-transmitting antenna modified by the short-term filtering coefficient; and
   determining the short-term antenna metric difference based on a difference between the first downlink metric value and the second downlink metric value.

5. The method of claim 3, wherein calculating the short-term antenna metric difference between the transmitting antenna and the non-transmitting antenna includes:
   applying a short-term filtering coefficient to a combination of current and previous short-term downlink metric values for the transmitting antenna and the non-transmitting antenna;
   wherein calculating the mid-term antenna metric difference between the transmitting antenna and the non-transmitting antenna includes:
   applying a mid-term filtering coefficient to a combination of current and previous mid-term downlink metric values for the transmitting antenna and the non-transmitting antenna; and
   wherein calculating the long-term antenna metric difference between the transmitting antenna and the non-transmitting antenna includes:
   applying a long-term filtering coefficient to a combination of current and previous long-term downlink metric values for the transmitting antenna and the non-transmitting antenna.

6. The method of claim 3, wherein the downlink metric includes at least one of:
   a downlink Reference Signal Receive Power (RSRP) measurement;
   a Received Signal Strength Indicator (RSSI) measurement; or
   a downlink pathloss measurement.

7. The method of claim 2, wherein the metric includes an uplink metric.

8. The method of claim 7, wherein calculating the short-term antenna metric difference between the transmitting antenna and the non-transmitting antenna includes:
   determining a first uplink metric value based on a combination of a current uplink metric value for the transmitting antenna and a previous uplink metric value for the transmitting antenna modified by a short-term filtering coefficient;
   determining a second uplink metric value based on a previous uplink metric value estimate modified by the short-term filtering coefficient and by a constant set to control a frequency of antenna switching; and
   determining the short-term antenna metric difference based on a difference between the first uplink metric value and the second uplink metric value.

9. The method of claim 7, wherein calculating the short-term antenna metric difference between the transmitting antenna and the non-transmitting antenna includes:
   applying a short-term filtering coefficient to a combination of current and previous short-term uplink metric values for the transmitting antenna and an estimated short-term uplink metric value for the non-transmitting antenna modified by a switching frequency constant;
   wherein calculating the mid-term antenna metric difference between the transmitting antenna and the non-transmitting antenna includes:
   applying a mid-term filtering coefficient to a combination of current and previous mid-term uplink metric values for the transmitting antenna and an estimated mid-term uplink metric value for the non-transmitting antenna modified by the switching frequency constant; and
   wherein calculating the long-term antenna metric difference between the transmitting antenna and the non-transmitting antenna includes:
   applying a long-term filtering coefficient to a combination of current and previous long-term downlink metric values for the transmitting antenna and an estimated long-term uplink metric value for the non-transmitting antenna modified by the switching frequency constant.

10. The method of claim 7, wherein the uplink metric includes at least one of:
   a power headroom measurement;
   a shared channel transmitting power measurement;
   a control channel transmitting power measurement;
   a Sounding Reference Signal (SRS) transmitting power measurement;
   a total transmitting power measurement;
   a percent of time interval reaching maximum power measurement;
   an antenna reflected power measurement;
   an uplink throughput measurement; or
   an uplink Block Error Rate (BLER) measurement.

11. The method of claim 2, wherein the metric includes a downlink metric, the method further comprising:
   calculating a short-term antenna uplink metric difference between the transmitting antenna and the non-transmitting antenna, wherein the short-term antenna metric difference measures a difference in an uplink metric over the first time period;
   calculating a mid-term antenna uplink metric difference between the transmitting antenna and the non-transmitting antenna, wherein the mid-term antenna metric difference measures a difference in the uplink metric over the second time period;
   calculating a long-term antenna uplink metric difference between the transmitting antenna and the non-transmitting antenna, wherein the long-term antenna metric difference measures a difference in the uplink metric over the third time period; and
   wherein determining whether to switch the transmitting antenna and the non-transmitting antenna is based on whether at least one of the calculated short-term antenna metric difference is greater than a downlink short-term threshold, the calculated mid-term antenna metric difference is greater than a downlink mid-term threshold, or the long-term antenna metric difference is greater than a downlink long-term threshold, and on whether at least one of the calculated short-term antenna uplink metric difference is greater than an uplink short-term threshold, the calculated mid-term antenna uplink metric difference is greater than an uplink mid-term threshold, or the long-term antenna uplink metric difference is greater than an uplink long-term threshold.

12. The method of claim 11, further comprising:
   determining whether a downlink metric value for the transmitting antenna is within a particular range; and
   wherein determining whether to switch the transmitting antenna and the non-transmitting antenna is further based on whether the downlink metric value for the transmitting antenna is within the particular range.

13. The method of claim 1, further comprising:
   determining that the wireless communication device is at a maximum transmitting power;
   determining that a particular uplink metric for the transmitting antenna is greater than a performance threshold while the wireless communication device is at maximum transmitting power; and
   switching the second antenna to the transmitting antenna and the first antenna to the non-transmitting antenna, in response to determining that the particular uplink metric for the transmitting antenna is greater than the performance threshold while the wireless communication device is at maximum transmitting power.

14. A wireless communication device comprising:
   logic configured to:
   select a first antenna as a transmitting antenna and a second antenna as a non-transmitting antenna;
   calculate a short-term antenna metric difference between the transmitting antenna and the non-transmitting antenna, wherein the short-term antenna metric difference measures a difference in a metric over a first time period;
   calculate a mid-term antenna metric difference between the transmitting antenna and the non-transmitting antenna, wherein the mid-term antenna metric difference measures a difference in the metric over a second time period that is longer than the first time period;
   calculate a long-term antenna metric difference between the transmitting antenna and the non-transmitting antenna, wherein the long-term antenna metric difference measures a difference in the metric over a third time period that is longer than the second time period;
   determine whether to switch the transmitting antenna and the non-transmitting antenna based on whether at least one of the calculated short-term antenna metric difference is greater than a short-term threshold, the calculated mid-term antenna metric difference is greater than a mid-term threshold, or the long-term antenna metric difference is greater than a long-term threshold; and switch the second antenna to the transmitting antenna and the first antenna to the non-transmitting antenna, in response to determining to switch the transmitting antenna and the non-transmitting antenna.

15. The wireless communication device of claim 14, wherein the metric includes a downlink metric, and wherein, when calculating the short-term antenna metric difference between the transmitting antenna and the non-transmitting antenna, the logic is further configured to:

determine a first downlink metric value based on a combination of a current downlink metric value for the transmitting antenna and a previous downlink metric value for the transmitting antenna modified by a short-term filtering coefficient;

determine a second downlink metric value based on a combination of a current downlink metric value for the non-transmitting antenna and a previous downlink metric value for the non-transmitting antenna modified by the short-term filtering coefficient; and determine the short-term antenna metric difference based on a difference between the first downlink metric value and the second downlink metric value.

16. The wireless communication device of claim 14, wherein the metric includes a downlink metric, and wherein, when calculating the short-term antenna metric difference between the transmitting antenna and the non-transmitting antenna, the logic is further configured to:

apply a short-term filtering coefficient to a combination of current and previous short-term downlink metric values for the transmitting antenna and the non-transmitting antenna;

wherein, when calculating the mid-term antenna metric difference between the transmitting antenna and the non-transmitting antenna, the logic is further configured to:

apply a mid-term filtering coefficient to a combination of current and previous mid-term downlink metric values for the transmitting antenna and the non-transmitting antenna; and wherein, when calculating the long-term antenna metric difference between the transmitting antenna and the non-transmitting antenna, the logic is further configured to:

apply a long-term filtering coefficient to a combination of current and previous long-term downlink metric values for the transmitting antenna and the non-transmitting antenna.

17. The wireless communication device of claim 14, wherein the metric includes an uplink metric, and wherein, when calculating the short-term antenna metric difference between the transmitting antenna and the non-transmitting antenna, the logic is further configured to:

determine a first uplink metric value based on a combination of a current uplink metric value for the transmitting antenna and a previous uplink metric value for the transmitting antenna modified by a short-term filtering coefficient;

determine a second uplink metric value based on a previous uplink metric value estimate modified by the short-term filtering coefficient and by a constant set to control a frequency of antenna switching; and determine the short-term antenna metric difference based on a difference between the first uplink metric value and the second uplink metric value.

18. The wireless communication device of claim 14, wherein the metric includes an uplink metric, and wherein, when calculating the short-term antenna metric difference between the transmitting antenna and the non-transmitting antenna, the logic is further configured to:

apply a short-term filtering coefficient to a combination of current and previous short-term uplink metric values for the transmitting antenna and an estimated short-term uplink metric value for the non-transmitting antenna modified by a switching frequency constant;

wherein, when calculating the mid-term antenna metric difference between the transmitting antenna and the non-transmitting antenna, the logic is further configured to:

apply a mid-term filtering coefficient to a combination of current and previous mid-term uplink metric values for the transmitting antenna and an estimated mid-term uplink metric value for the non-transmitting antenna modified by the switching frequency constant; and wherein, when calculating the long-term antenna metric difference between the transmitting antenna and the non-transmitting antenna, the logic is further configured to:

apply a long-term filtering coefficient to a combination of current and previous long-term downlink metric values for the transmitting antenna and an estimated long-term uplink metric value for the non-transmitting antenna modified by the switching frequency constant.

19. The wireless communication device of claim 14, wherein the metric includes a downlink metric, and the logic is further configured to:

calculate a short-term antenna uplink metric difference between the transmitting antenna and the non-transmitting antenna, wherein the short-term antenna metric difference measures a difference in an uplink metric over the first time period;

calculate a mid-term antenna uplink metric difference between the transmitting antenna and the non-transmitting antenna, wherein the mid-term antenna metric difference measures a difference in the uplink metric over the second time period;

calculate a long-term antenna uplink metric difference between the transmitting antenna and the non-transmitting antenna, wherein the long-term antenna metric difference measures a difference in the uplink metric over the third time period; and wherein the logic to determine whether to switch the transmitting antenna and the non-transmitting antenna includes:

logic to determine whether to switch the transmitting antenna and the non-transmitting antenna based on whether at least one of the calculated short-term antenna metric difference is greater than a downlink short-term threshold, the calculated mid-term antenna metric difference is greater than a downlink mid-term threshold, or the long-term antenna metric difference is greater than a downlink long-term threshold, and on whether at least one of the calculated short-term antenna uplink metric difference is greater than an uplink short-term threshold, the calculated mid-term antenna uplink metric difference is greater than an uplink mid-term threshold, or the long-term antenna uplink metric difference is greater than an uplink long-term threshold.

20. A non-transitory computer-readable memory device storing instructions executable by a processor, the non-transitory computer-readable memory device comprising:

one or more instructions to select a first antenna as a transmitting antenna and a second antenna as a non-transmitting antenna;

one or more instructions to calculate a short-term antenna downlink metric difference between the transmitting antenna and the non-transmitting antenna, wherein the short-term antenna downlink metric difference measures a difference in a metric over a first time period;

one or more instructions to calculate a mid-term antenna downlink metric difference between the transmitting antenna and the non-transmitting antenna, wherein the mid-term antenna downlink metric difference measures a difference in the metric over a second time period that is longer than the first time period;

one or more instructions to calculate a long-term antenna downlink metric difference between the transmitting antenna and the non-transmitting antenna, wherein the long-term antenna downlink metric difference measures a difference in the metric over a third time period that is longer than the second time period;

one or more instructions to calculate a short-term antenna uplink metric difference between the transmitting antenna and the non-transmitting antenna, wherein the short-term antenna metric difference measures a difference in an uplink metric over the first time period;

one or more instructions to calculate a mid-term antenna uplink metric difference between the transmitting antenna and the non-transmitting antenna, wherein the mid-term antenna metric difference measures a difference in the uplink metric over the second time period;

one or more instructions to calculate a long-term antenna uplink metric difference between the transmitting antenna and the non-transmitting antenna, wherein the long-term antenna metric difference measures a difference in the uplink metric over the third time period;

one or more instructions to determine whether to switch the transmitting antenna and the non-transmitting antenna based on whether at least one of the calculated short-term antenna metric difference is greater than a downlink short-term threshold, the calculated mid-term antenna metric difference is greater than a downlink mid-term threshold, or the long-term antenna metric difference is greater than a downlink long-term threshold, and on whether at least one of the calculated short-term antenna uplink metric difference is greater than an uplink short-term threshold, the calculated mid-term antenna uplink metric difference is greater than an uplink mid-term threshold, or the long-term antenna uplink metric difference is greater than an uplink long-term threshold; and one or more instructions to switch the second antenna to the transmitting antenna and the first antenna to the non-transmitting antenna, in response to determining to switch the transmitting antenna and the non-transmitting antenna.

\* \* \* \* \*